US009873051B2

(12) United States Patent
Nilsson et al.

(10) Patent No.: US 9,873,051 B2
(45) Date of Patent: Jan. 23, 2018

(54) METHOD AND APPARATUS

(71) Applicant: KING.COM LIMITED, St. Julians (MT)

(72) Inventors: Tina Nilsson, Stockholm (SE); Klas Norden, Stockholm (SE)

(73) Assignee: KING.COM LTD., St. Julians (MT)

( * ) Notice: Subject to any disclaimer, the term of this patent is extended or adjusted under 35 U.S.C. 154(b) by 77 days.

(21) Appl. No.: 14/623,800

(22) Filed: Feb. 17, 2015

(65) Prior Publication Data
US 2016/0236086 A1 Aug. 18, 2016

(51) Int. Cl.
A63F 13/822 (2014.01)
A63F 13/573 (2014.01)

(52) U.S. Cl.
CPC .................. A63F 13/573 (2014.09)

(58) Field of Classification Search
CPC .......... A63F 13/45; A63F 13/47; A63F 13/50; A63F 13/55; A63F 13/56; A63F 13/58; A63F 2300/65; A63F 13/573
USPC ..................................... 463/31, 29
See application file for complete search history.

(56) References Cited

U.S. PATENT DOCUMENTS 8,167,714 B2 * 5/2012 Tawara ................... A63F 13/00 463/30
8,317,582 B2 * 11/2012 Nagaoka ................. A63F 13/10 463/32
8,469,811 B2 * 6/2013 Watanabe ............... A63F 13/10 463/37
9,218,712 B2 * 12/2015 Ito ....................... G07F 17/3227
2010/0234083 A1 * 9/2010 Hagiwara ............... A63F 13/10 463/9

OTHER PUBLICATIONS

"Hexic", https://en.wikipedia.org/wiki/Hexic, Retrieved on Sep. 21, 2016.*

* cited by examiner

Primary Examiner — Allen Chan
(74) Attorney, Agent, or Firm — Saul Ewing Arnstein & Lehr LLP

(57) ABSTRACT

A computer implemented method of providing a game, comprising at least one processor and at least one memory of a device, retrieving from at least one memory information associated with a plurality of first objects and one or more characteristics of said first objects and causing said objects with said one or more characteristics to be displayed on a first area of a display in an arrangement, executing an algorithm which identifies a match condition between said first objects in which at least one of said objects comprises an action characteristic, determines at least one upgrade path in the arrangement in dependence on the action characteristic and determines if at least one first object comprising an action characteristic is positioned on the at least one upgrade path and, if so, determines a level characteristic value of said at least one first object positioned on the determined upgrade path.

17 Claims, 12 Drawing Sheets

METHOD AND APPARATUS

FIELD OF THE INVENTION

Some embodiments may have particular, but not exclusive application in the field of computer implemented applications including for example games, in an online or offline environment, and computing devices therefor.

BACKGROUND OF THE INVENTION

There exist many types of computer device where the display is controlled by an input. In some embodiments the input may be a cursor or pointer that is controlled by a human interface device such as a mouse, joystick, keyboard etc. Additionally or alternatively the display may comprise a touchscreen which can be controlled by a user's touch. That is, activation of functions and objects is responsive to user input made by way of the user actually touching a particular object displayed on the screen, and thereby selecting that object. Most commonly, that touch is by a user's finger.

There are many technical challenges and technical considerations facing the designer of computer applications such as games executed on a user or computer or other device having a user interface, such as designing algorithms for controlling the game mechanic.

One particular context is that of a computer game where a game board is displayed to a user which has adjacent selectable objects, for example in the form of game tiles having at least one characteristic, displayed in an arrangement. In one game, the mechanic of the game is that a user should select a tile and switch it with an adjacent tile to form a sequence of three or more game tiles having matching characteristics.

SUMMARY OF THE INVENTION

In a first aspect there is provided a computer implemented method of providing a game, the method comprising the following implemented by at least one processor and at least one memory of a device, retrieving from at least one memory information associated with a plurality of first objects and one or more characteristics of said first objects and causing said objects with said one or more characteristics to be displayed on a first area of a display in an arrangement, executing an algorithm which identifies a match condition between said first objects in which at least one of said objects comprises an action characteristic, determines at least one upgrade path in the arrangement in dependence on the action characteristic and determines if at least one first object comprising an action characteristic is positioned on the at least one upgrade path and, if so, determines a level characteristic value of said at least one first object positioned on the determined upgrade path.

The algorithm may determine at least one upgrade path in the arrangement in dependence on the action characteristic and determine if at least one first object comprising an action characteristic is positioned on the at least one upgrade path and, if so, determine a level characteristic value of said at least one first object positioned on the determined upgrade path in response to identifying a match condition between said first objects in which at least one of said objects comprises an action characteristic.

In some embodiments, the algorithm may cause a second game object to be displayed moving along the determined upgrade path.

In some embodiments, the algorithm may cause a second game object to be displayed moving along the determined upgrade path when the level characteristic value corresponds to a predefined value.

The level characteristic value may comprise a predetermined number of values up to a maximum value.

The algorithm may increment the level characteristic value associated with the at least one first object positioned on the determined upgrade path to the next level characteristic value.

When the level characteristic value associated with the first game object positioned on the determined upgrade path corresponds to the maximum value, the algorithm may determine at least one second upgrade path, determines if at least one first object comprising an action characteristic is positioned on the at least one second upgrade path and, if so, determine a level characteristic value of said at least one first object positioned on the determined second upgrade path.

The algorithm may cause an updated arrangement to be displayed with said at least one first object positioned on the determined upgrade path indicating the level characteristic value.

Identifying a match condition may comprise determining a selection of a first game object in dependence on user input received via a user interface and in dependence on the stored information on said arrangement, and executing an algorithm to determine if said user input is such that said first objects are arranged to provide a sequence of at least three adjacent first objects sharing at least one same characteristic.

The method may comprise retrieving from at least one memory information associated with a plurality of third game objects and causing said third game objects to be displayed on a second area of the display, wherein said algorithm determines if at least one third game object is positioned on the determined first upgrade path and, if so determines at least one third upgrade path in the arrangement and determines if at least one first object comprising an action characteristic is positioned on the at least one third upgrade path and, if so, determines an level characteristic value of said at least one first object positioned on the third upgrade path.

In a second aspect there is provided an apparatus, said apparatus comprising at least one processor and at least one memory, said at least one processor and said at least one memory configured to retrieve from at least one memory information associated with a plurality of first objects and one or more characteristics of said first objects and causing said objects with said one or more characteristics to be displayed on a first area of a display in an arrangement, to identify a match condition between said first objects in which at least one of said objects comprises an action characteristic, determine at least one upgrade path in the arrangement in dependence on the action characteristic and determine if at least one first object comprising an action characteristic is positioned on the at least one upgrade path and, if so, determine a level characteristic value of said at least one first object positioned on the determined upgrade path.

In some embodiment's, the apparatus may be configured to cause a second game object to be displayed moving along the determined upgrade path.

In some embodiments, the apparatus may be configured to cause a second game object to be displayed moving along the determined upgrade path when the level characteristic value corresponds to a predefined value.

The apparatus may be configured to determine at least one upgrade path in the arrangement in dependence on the action characteristic and determine if at least one first object comprising an action characteristic is positioned on the at least one upgrade path and, if so, determine a level characteristic value of said at least one first object positioned on the determined upgrade path in response to identifying a match condition between said first objects in which at least one of said objects comprises an action characteristic.

The level characteristic value may comprise a predetermined number of values up to a maximum value.

The apparatus may be configured to increment the level characteristic value associated with the at least one first object positioned on the determined upgrade path to the next level characteristic value.

When a level characteristic value corresponds to the maximum value, the apparatus may be configured to determine at least one second upgrade path in the arrangement in dependence on the action characteristic, determine if at least one first object comprising an action characteristic is positioned on the at least one second upgrade path if so, determine an level characteristic value of said at least one first object positioned on the second upgrade path.

The apparatus may be configured to cause an updated arrangement to be displayed with said at least one first object positioned on the determined upgrade path indicating the level characteristic value.

Identifying a match condition may comprise determining a selection of a first game object in dependence on user input received via a user interface and in dependence on the stored information on said arrangement and the processor is configured to determine if said user input is such that said first objects are arranged to provide a sequence of at least three adjacent first objects sharing at least one same characteristic.

The apparatus may be configured to retrieve from at least one memory information associated with a plurality of third game objects and cause said third game objects to be displayed on a second area of the display, determine if at least one third game object is positioned on the determined upgrade path and, if so determines at least one third upgrade path and determine if at least one first object comprising an action characteristic is positioned on the at least one third upgrade path and, if so, determines an level characteristic value of said at least one first object positioned on the third upgrade path.

The processor may be configured to perform the steps of the first aspect.

In a third aspect there is provided a computer readable storage device storing instructions that, when processed by at least one processor of a device, causes said processor to retrieve from at least one memory information associated with a plurality of first objects and one or more characteristics of said first objects and causing said objects with said one or more characteristics to be displayed on a first area of a display in an arrangement identify a match condition between said first objects in which at least one of said objects comprises an action characteristic, determine at least one upgrade path in the arrangement in dependence on the action characteristic and determine if at least one first object comprising an action characteristic is positioned on the at least one upgrade path and, if so, determine a level characteristic value of said at least one first object positioned on the determined upgrade path.

In a fourth aspect there is provided a computer readable storage device storing instructions that, when processed by at least one processor of a device, causes said processor to perform the method of the first aspect.

BRIEF DESCRIPTION OF DRAWINGS

To understand some embodiments, reference will now be made by way of example only to the accompanying drawings, in which.

DETAILED DESCRIPTION OF SOME EMBODIMENTS

The techniques described herein can be implemented in for instance a computer application which involves the matching of objects displayed on a game area or game board and the elimination of such to complete a level or aim or target score of such a game. The game may be a so-called "casual" or "social" game, wherein short periods of play are undertaken by the user whenever appropriate according to the user's schedule.

Such games are increasingly offered and played by users on a wide range of devices such as portable devices such as mobile phones, smart pad or tablets or larger devices such as desk top computers or lap top computers.

Figure 1:
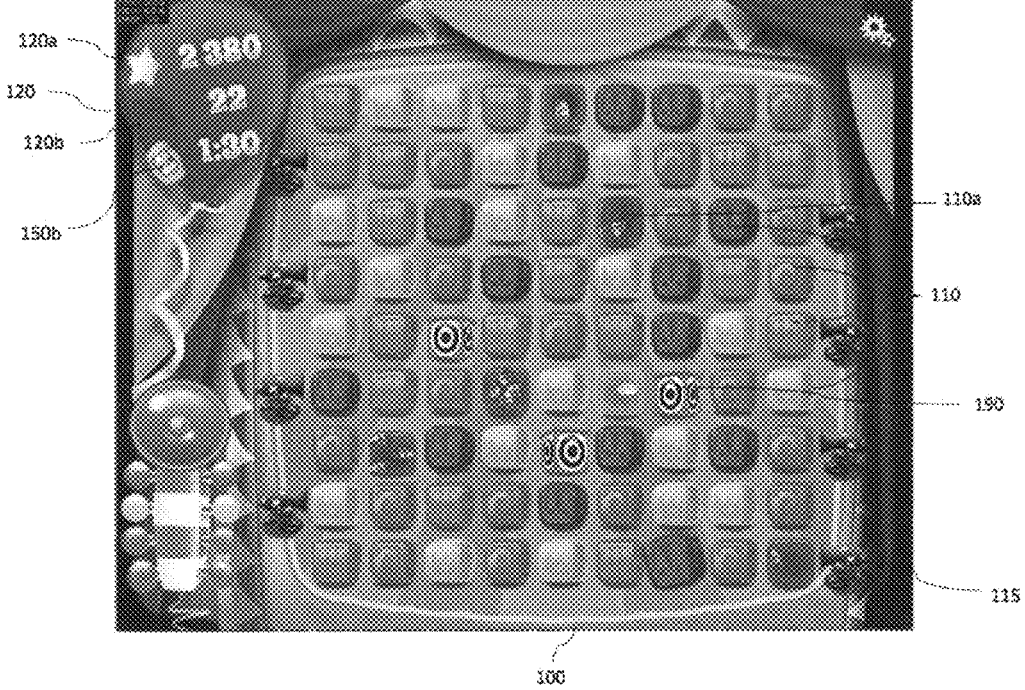
FIG. 1 shows an example embodiment of a game board.

FIG. 1 shows an example game board of a tile based computer implemented game according to an embodiment.

The game board 100 or playable area 100 is displayed upon which are disposed game objects 110. The game objects 110 in this embodiment comprise tiles which may have at least one characteristic associated therewith. The characteristics may be one or more of color and/or shape per object or tile 110. In this embodiment, the objects 110 are box-like tiles arranged in a rectangular grid like fashion, although in other embodiments other game board configurations and other game object shapes or tiles may be utilized.

The object of the game may be to provide a sequence of adjacent game objects 110, for example three adjacent game objects 110, sharing the same characteristic. Game objects 110 may be switched with adjacent game objects 110 to provide such a sequence.

A game object may also comprise an "entity" rather than a tile. Whereas a tile may be considered a space on a game board grid, an entity may be considered something that occupies that space.

In some embodiments, "blockers" may be present which may act to block a user during gameplay. The blocker may be a blank tile which cannot be switched with an adjacent tile, or some form of entity. Such blockers can therefore be used to make a level harder. A blocker may be a permanent fixture in a given level, or may be removable, for example by using adjacent tiles to form a sequence of, for example, three or more adjacent tiles having the same characteristic. An example of a blocker is a "rock-blocker". The blocker may switch position during gameplay or may be fixed in position. A further example of a blocker is shown in FIG. 1 as box 190. The box 190 may have one or more elements associated with it. The number of elements associated with a box 190 may be modified. The box 190 may be removable from an arrangement once the number of elements associated with the box 190 has reached a predetermined value.

A game object 110a may have an action characteristic associated therewith. The action characteristic may have at least one associated level characteristic value. The level characteristic value may comprise a predetermined number of values up to a maximum value. For example, the level characteristic value may comprise 2, 3 or 4 values.

A game object 110a having an action characteristic may be created when a certain match condition is met. For example, if the user input is such that the tiles are arranged so that 4 or more adjacent tiles have the same characteristic, one of the tiles may be associated with an action characteristic. The corresponding level characteristic value may depend on the match condition, e.g. the number of game tiles in the sequence.

A further game object 115 may be positioned in a second area of the display outside the game board arrangement. For example, cannons as shown in FIG. 1 are displayed outside of the game tiles 110.

In some embodiments, the game may be implemented so that a level or a game session is completed when a certain target is reached by the user.

When a sequence of three or more adjacent tiles is formed, then at least some of the game tiles forming that sequence may be automatically removed from the screen and game tiles above the removed game tiles drop down. New game tiles are provided to the screen from above to replenish the gaps now left by the tiles which have dropped down.

The target may comprise achieving a certain score by arranging tiles 110 to make a sequence of three or more adjacent tiles have the same characteristic, each sequence scoring a particular score depending on the number of game tiles in the sequence.

The target may alternatively be to remove one or more specific tiles, to reach a certain number of elements associated with the boxes, reach a certain number of points etc.

The game board 100 may be accompanied by a region 120 indicating a current score 120a and a number of moves remaining 120b as shown in FIG. 1.

The game can in some embodiments end if the player or user runs out of time 150b or runs out of moves 120b before managing to reach a designated target (not shown).

The game board 100 may have a number of game objects 110 having different characteristics aligned in rows and columns, such as a 9×9 grid as shown in FIG. 1. Other grid sizes may be suitable. In such an embodiment the game objects on the game board have three, five or eight nearest or adjacent game object tiles. Other game board layouts or configurations may be provided. For example, triangular, pyramidal, hexagonal, octagonal or other layouts comprising position spaces or tiles within the game board 100 may be provided for display.

There may also be provided control or optional actional items such as shuffle control, and a game reset or off control, music and sound or volume control.

Figure 2:
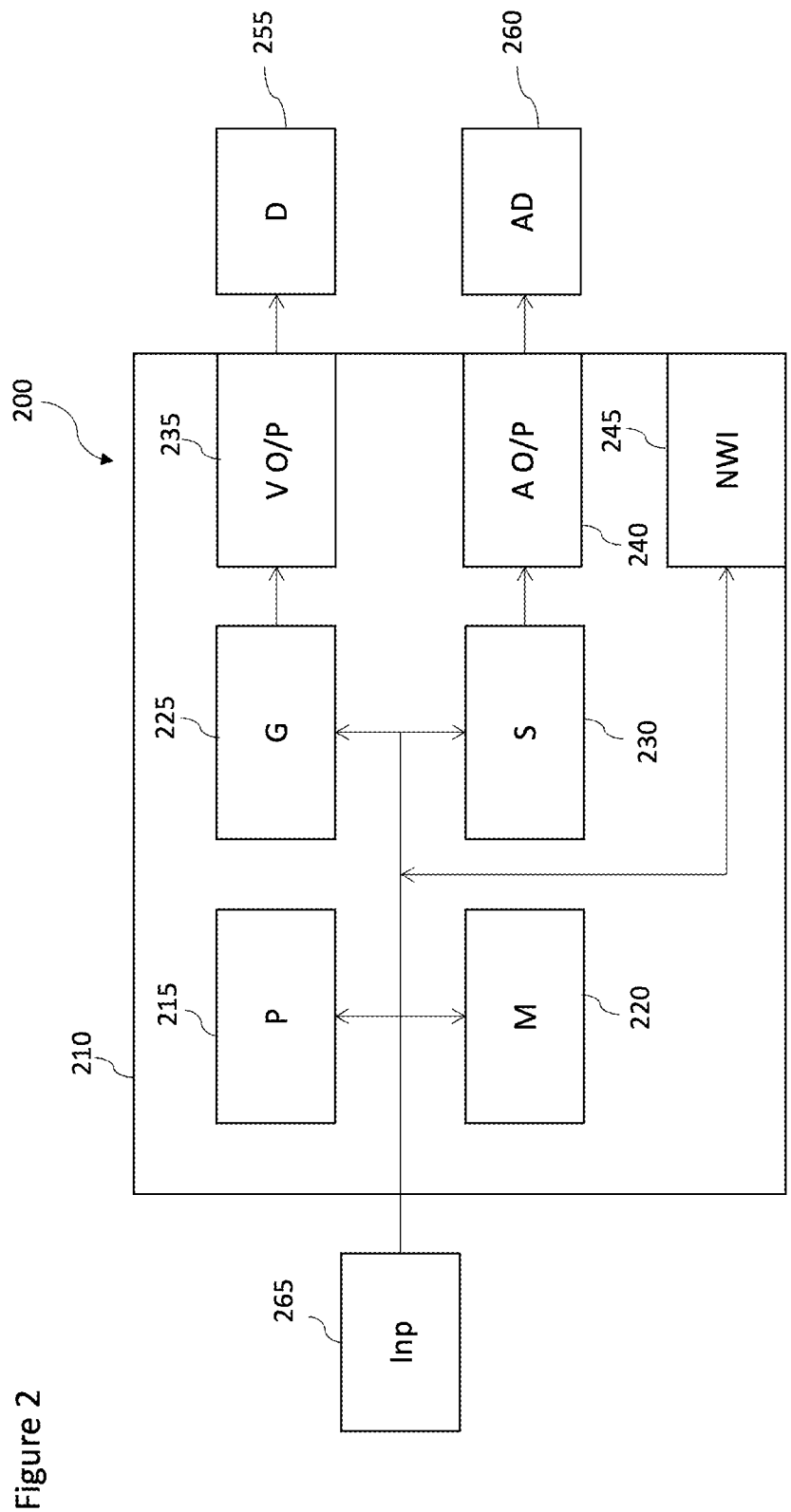
FIG. 2 shows an example user device in which some embodiments may be provided.

A schematic view of a user or computing device 200 according to an embodiment is shown in FIG. 2. All of the blocks shown are implemented by suitable circuitry. The blocks may be implemented in hardware and/or software. The user device may have a control part 210. The control part 210 has one or more processors 215 and one or more memories 220. The control part 210 is also shown as having a graphics controller 225 and a sound controller 230. It should be appreciated that one or other or both of the graphics controller 225 and sound controller 230 may be provided by the one or more processors 215.

The graphics controller 225 is configured to provide a video output 235. The sound controller 230 is configured to provide an audio output 240. The controller 210 has an interface 245 allowing the device to be able to communicate with a network such as the Internet or other communication infrastructure.

The video output 235 is provided to a display 255. The audio output 240 is provided to an audio device 260 such as a speaker and/or earphone(s).

The device 200 has an input device 265. The input device 265 can take any suitable format and can be one or more of a keyboard, mouse, touch screen, joystick or game controller. It should be appreciated that the display 255 may in some embodiments also provide the input device 265 by way of an integrated touch screen for example.

The blocks of the controller 210 are configured to communicate with each other via an interconnect such as a bus or any other suitable interconnect and/or by point to point communication.

It should be appreciated that in some embodiments, the controller 210 may be implemented by one or more integrated circuits, at least in part.

The user device 200 is shown by way of example only. In alternative embodiments, one or more of the parts may be omitted. Alternatively or additionally, some embodiments may comprise one or more other parts. Alternatively or additionally, one or more parts may be combined.

Figure 3:
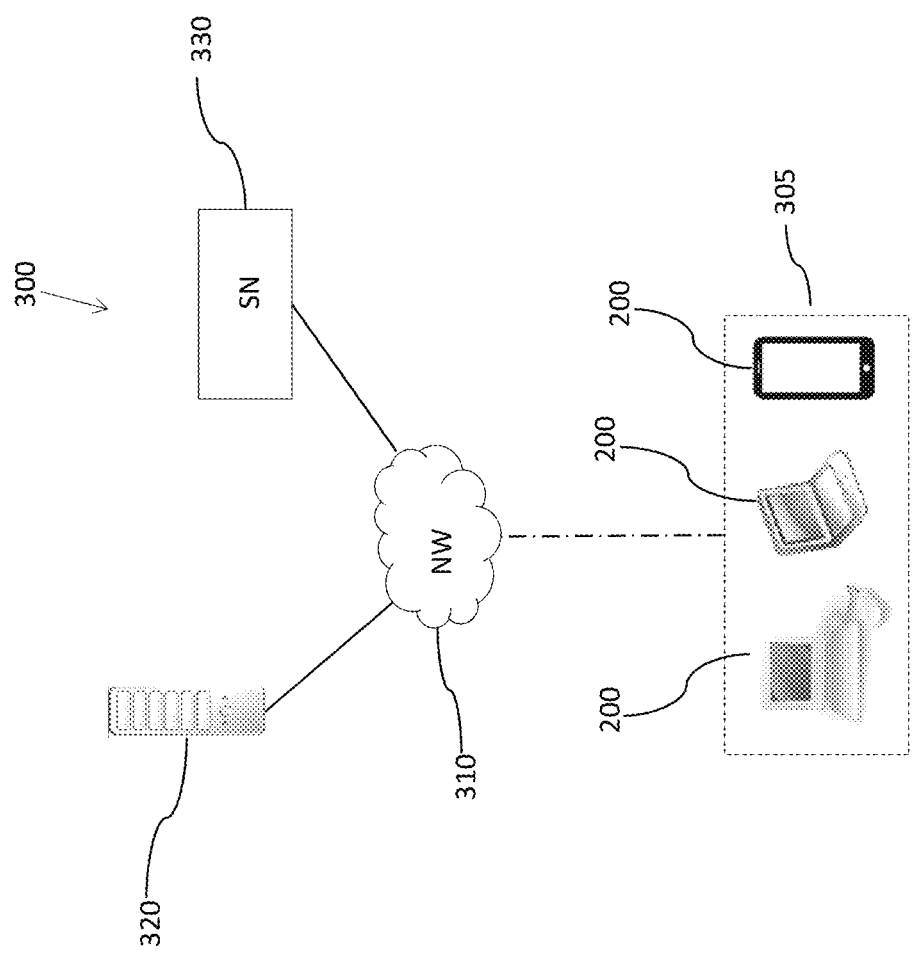
FIG. 3 shows an example system in which some embodiments may be provided.

FIG. 3 schematically shows a system 300 in some embodiments. The system 300 comprises a server 320 which may store databases of game players' details, profiles, high scores and so on. In practice, one or more databases may be provided. Where more than one server is provided, the database(s) may be provided in one database or across two or more servers 320. The server 320 may also have a games data function. This may comprise a memory to store the computer game program and a processor to run the games program.

The server may communicate via for instance the internet 310 to one or more user devices 305 and may further provide connections to a social network 330 such as Facebook™.

It should be appreciated that embodiments may be deployed in different system architectures. For example, the computer game may be implemented as a computer game that is stored in the memory 220 of the user device 200 and is run on the processor 215 of the user device 200. However, the server 320 may handle some elements of the game in some embodiments. By way of example only, a Java game applet may be provided to the user device 200 and the locally running Java applet will generate, for example, the graphics, sounds, and user interaction for the game play on the user device 200. Some data may be fed back to the server 320 to allow interaction with other user devices 305. The data which is fed back may also allow scoring and/or cross platform synchronization.

In some embodiments, the game may be implemented as a computer program that is stored in a memory of the system, for example the server 320, and which runs on a processor of the game server. Data streams or updates are supplied to the user device 200 to allow the user device 200 to render and display graphics and sounds in a browser of the user device 200. Such an approach is sometimes referred to as a web services approach. It should be appreciated, however, that such an approach does not necessarily require the use of the Internet.

Figure 4:
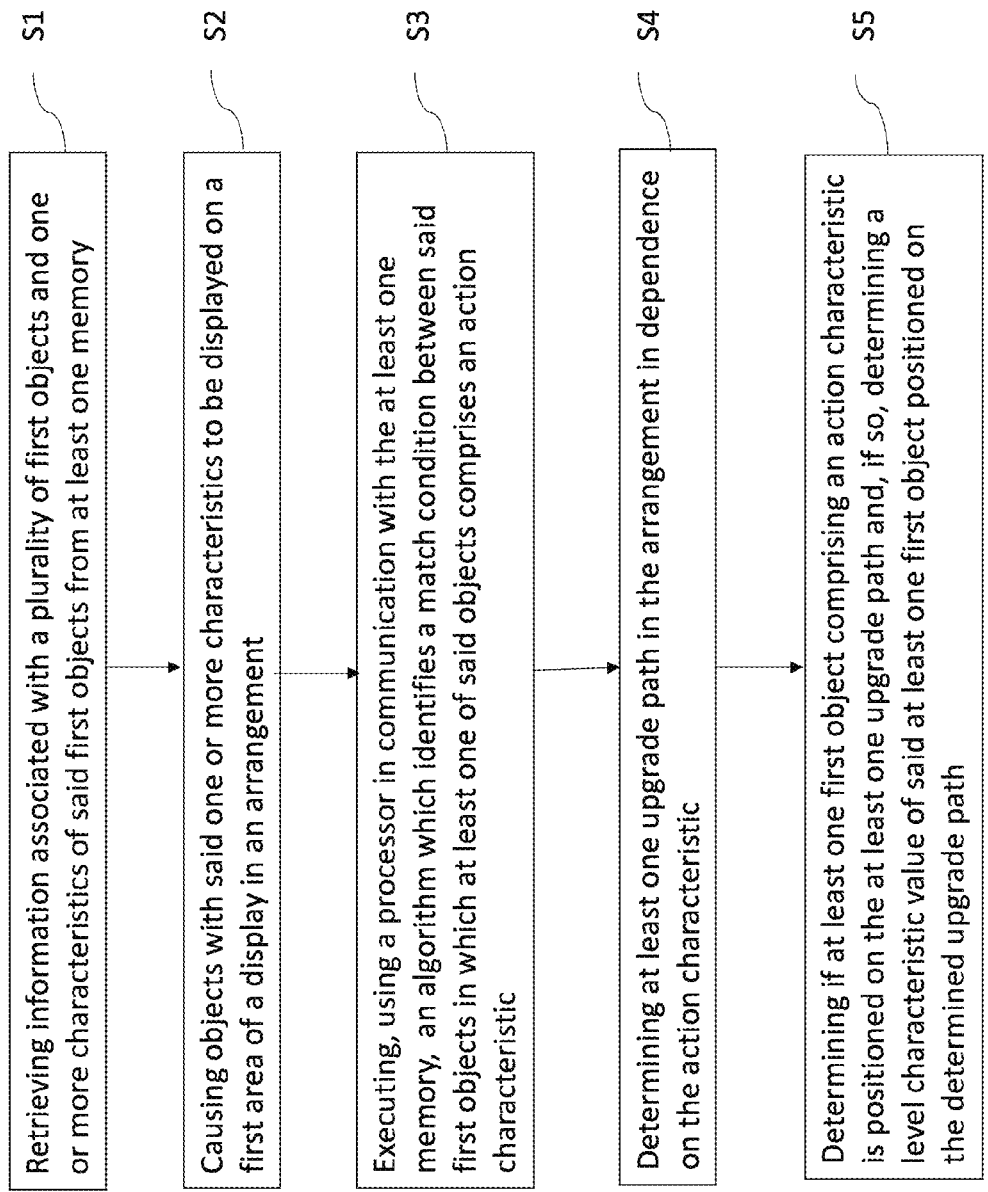
FIG. 4 shows a flowchart according to an embodiment.

FIG. 4 is a flowchart according to some embodiments.

At step S1, information associated with a plurality of first objects and one or more characteristics of said first objects is retrieved from at least one memory.

At step S2, objects with said one or more characteristics are caused to be displayed on a first area of a display in an arrangement.

At step S3, a processor in communication with the at least one memory executes an algorithm which identifies a match condition between said first objects in which at least one of said objects comprises an action characteristic.

At step S4 the processor determines at least one upgrade path in the arrangement in dependence on the action characteristic.

At step S5, the processor determines if at least one first object comprising an action characteristic is positioned on the at least one upgrade path and, if so, determines a level characteristic value of said at least one first object positioned on the determined upgrade path.

The processor may determine the at least one upgrade path in response to identifying a match condition between said first objects in which at least one of said objects comprises an action characteristic.

Identifying a match condition may comprise determining a selection of a first game object in dependence on user input received via a user interface and in dependence on the stored information on said arrangement, and the processor executing an algorithm to determine if said user input is such that said first objects are arranged to provide a sequence of at least three adjacent first objects sharing at least one same characteristic. Of course it will be understood that the match condition described in relation to this embodiment is one example of a match condition and other match conditions such as "linker" or "slider" match conditions may be suitable, depending on the game mechanics.

The number of upgrade paths and/or the direction of the upgrade paths may be determined in independence on the level characteristic value associated with the action characteristic.

The processor may cause a second game object, for example, a projectile to be displayed moving along the determined upgrade path. The processor may cause the display to be updated such that first objects positioned on the determined upgrade path are displayed indicating the level characteristic value. For example, as can be seen in FIG. 1, a first object 110a having an action characteristic may be displayed with 1, 3 or 4 rockets, the number and orientation of the rockets indicative of a level characteristic value. It will of course be understood that rocket icons are only one type of icon that could be used in such a game and that the number, orientation and type of icons used to represent the level value characteristic may be any suitable representation.

If the level characteristic value is incremented to a maximum value, a second upgrade path in the arrangement may be determined by the processor. The second upgrade path may be determined in dependence on the action characteristic of the first object positioned on the first determined upgrade path. If the processor determines that a first game object is positioned on the second upgrade path, the processor may determine a level characteristic value of that first object. As a result, a chain reaction of upgrade paths may be determined.

The processor may determine if a third game object, for example a cannon 115 as shown in FIG. 1, is positioned on a determined upgrade path. If so, a further upgrade path may be determined and the processor may determine if a first object comprising an action characteristic is positioned on the further upgrade path. The processor may then determine a level characteristic value for that first object.

The processor may determine if a blocker with the qualities as described with relation to box 190 as shown in FIG. 1 is positioned on a determined upgrade path. If so, the processor may increment a number of elements associated with said blocker 190. If the number of elements associated with said blocker reaches a predetermined amount, the blocker may be removed from the game board arrangement.

Determining an upgrade path in an arrangement and determining if at least one first object comprising a characteristic is positioned on the determined upgrade path allows a characteristic associated with a tile, for example an level characteristic value, to be modified by a game action occurring at any point on the board.

Figure 5:
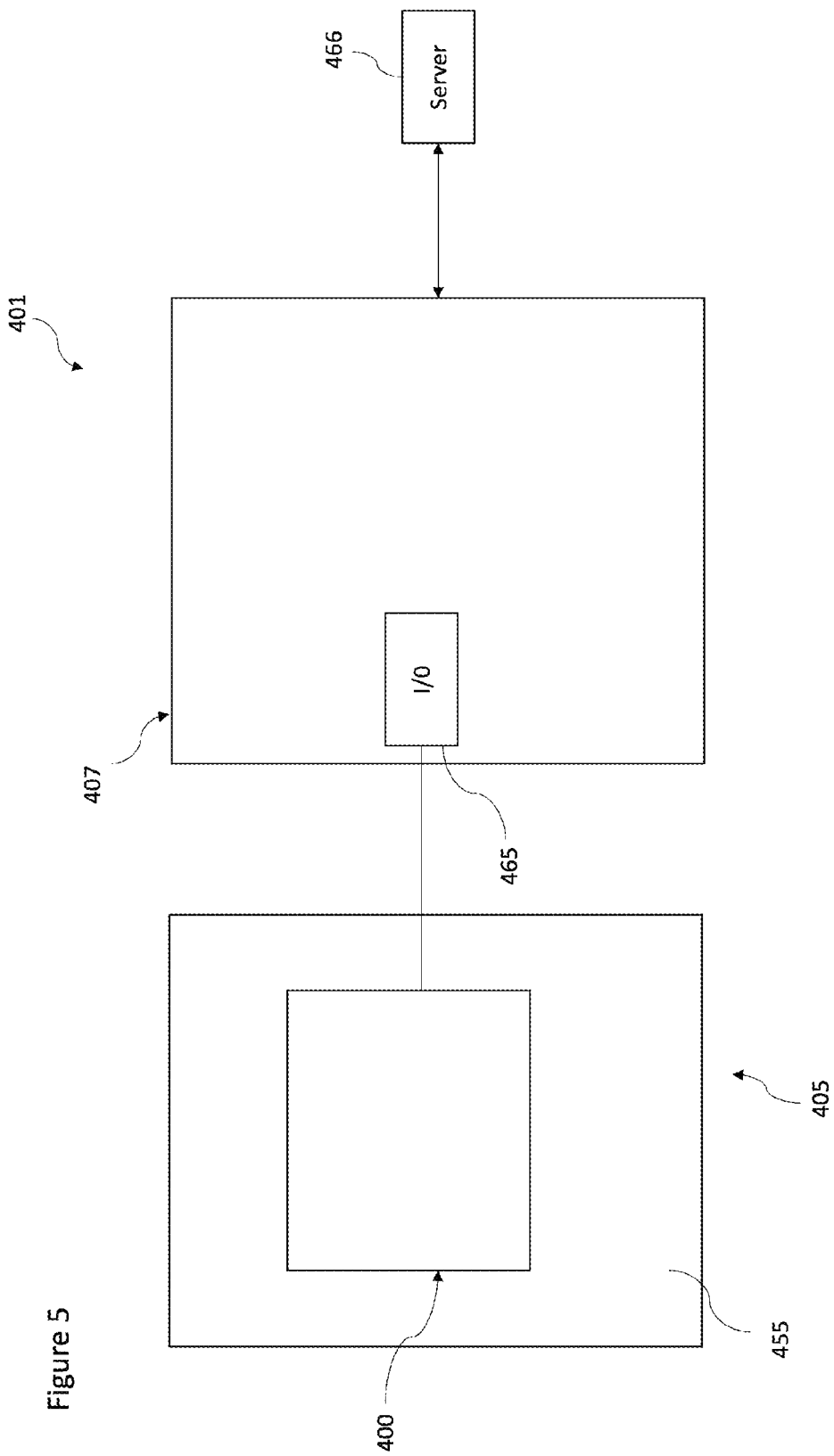
FIG. 5 also shows an example system in which some embodiments may be provided.

FIG. 5 is a schematic diagram showing a system 401 according to an embodiment. It will be understood that this diagram is simplified for the purposes of explanation, and that embodiments may be implemented in other ways. The system described with respect to FIG. 5 may operate in conjunction with the functional blocks described with respect to FIG. 6.

The system comprises a display 455 on a device 405. The display 455 is configured to display a game board 400. The device may be any suitable device such as a mobile phone, tablet, PC, laptop etc. The display 405 may be a touch screen display. Additionally or alternatively a user can navigate the display in another manner, such as by controlling a cursor with a mouse (in which case the display might not necessarily be touch screen).

A processing block is schematically shown at 407. The processing block may comprise one or more memories and one or more processors, for example as described with respect to FIG. 2. The processing block is communicatively connected to the display 405 via In-Out (I/O) interface 465.

The processing block 407 is in communication with server 466, such as a game server.

Although shown in a separated manner for the purposes of explanation, the elements shown within the processing block 407 in FIG. 5 can be contained within or distributed between the device 405 and the server 466 in any way.

Figure 6:
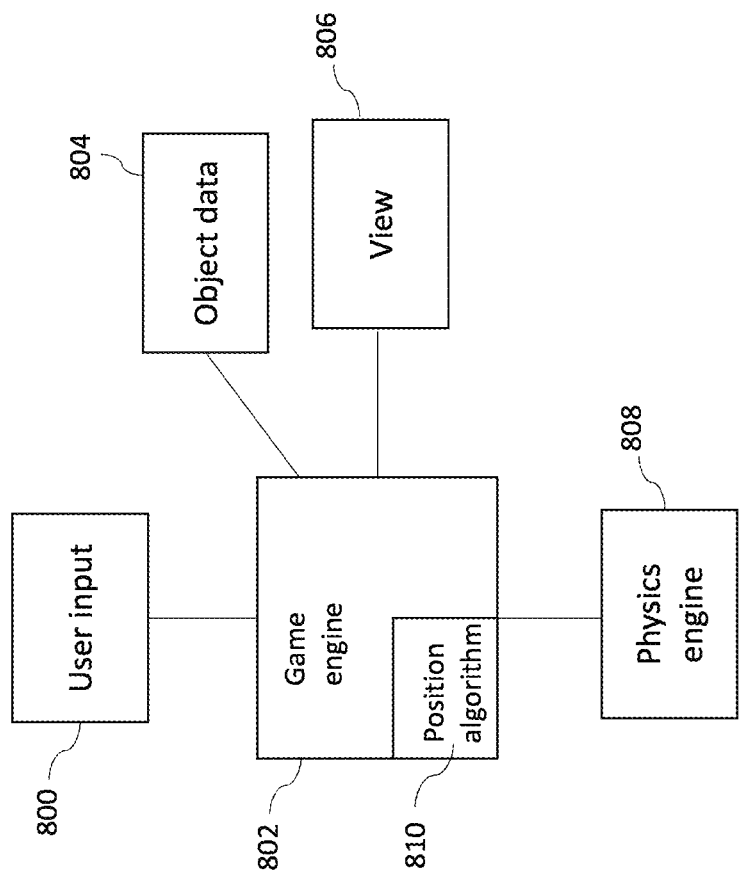
FIG. 6 schematically shows the functional blocks of an embodiment.

Reference is made to FIG. 6 which schematically shows the functional blocks of an embodiment, which may enable such game play. A user input block 800 is shown. This captures the user input and feeds the input to a game engine 802. In the context of the game of some embodiments, this user input may be which tiles are selected by a user and in which direction. This user input can be via any suitable user interface, such as discussed earlier.

The game engine 802 will process the information provided by the user input. The game engine 802 (for example a game model) will determine if a valid combination has been made.

Each object (e.g. game tile) has object data associated therewith. The object data 804 may be stored in any suitable memory location. In some embodiments, the object data may be considered to be part of the game engine and in other embodiments may be considered to be outside the game engine. The object data may provide information as to the properties of an object. These properties can include attribute information such as colour and/or whether or not an object has a particular function such as a so-called booster function. The object data may include the position data, that is, information representing the position of the object in the displayed image.

In some embodiments, the game engine will check if the game object satisfies the rule or rules for a valid match. The rule or rules which define whether or not a match condition has been satisfied. The match condition will be dependent on the game. In some embodiments, a match condition will be satisfied if the game tiles are arranged to provide a sequence of at least three adjacent first objects sharing at least one same characteristic. In some embodiments, the game objects of the sequence are removed.

Thus, the game engine will be in control of the matching mechanism. The game engine will have access to data for each tile including its position and the at least one characteristic associated with the tile, and will be able to determine if a match condition has been met. If a match condition is met, the tiles in the match may be removed.

A physics engine 808 is provided which is configured to control the movement of moving objects on the display, for example the falling objects and/or projectiles. A falling object may be one which has been caused to move or be removed as a result of a previous match. A projectile may be a game object which is displayed moving along a determined upgrade path. The physics engine will generally manage the movement of an object based on for example gravity which controls the falling of the object, collision detection, when the falling object hits another object and optionally rotation calculations when the falling object rolls, for example, down the side of the other objects. The physics engine may manage the movement of an object in dependence on the determined upgrade path.

The movement of the object is thus controlled by the physics engine, which will control the movement of an object as it falls, rolls down other objects, moves along a determined upgrade path etc.

The physics engine 808 may be part of the game engine 802.

A position control block 810 is provided. In the embodiment shown, this position control block may be part of the game engine. In other embodiments, this position control block may be outside the game engine. The position control block may be provided by a position algorithm in some embodiments.

A view function 806 uses of the object data to provide the displayed image with which the user is able to view and/or interact.

Figure 7:
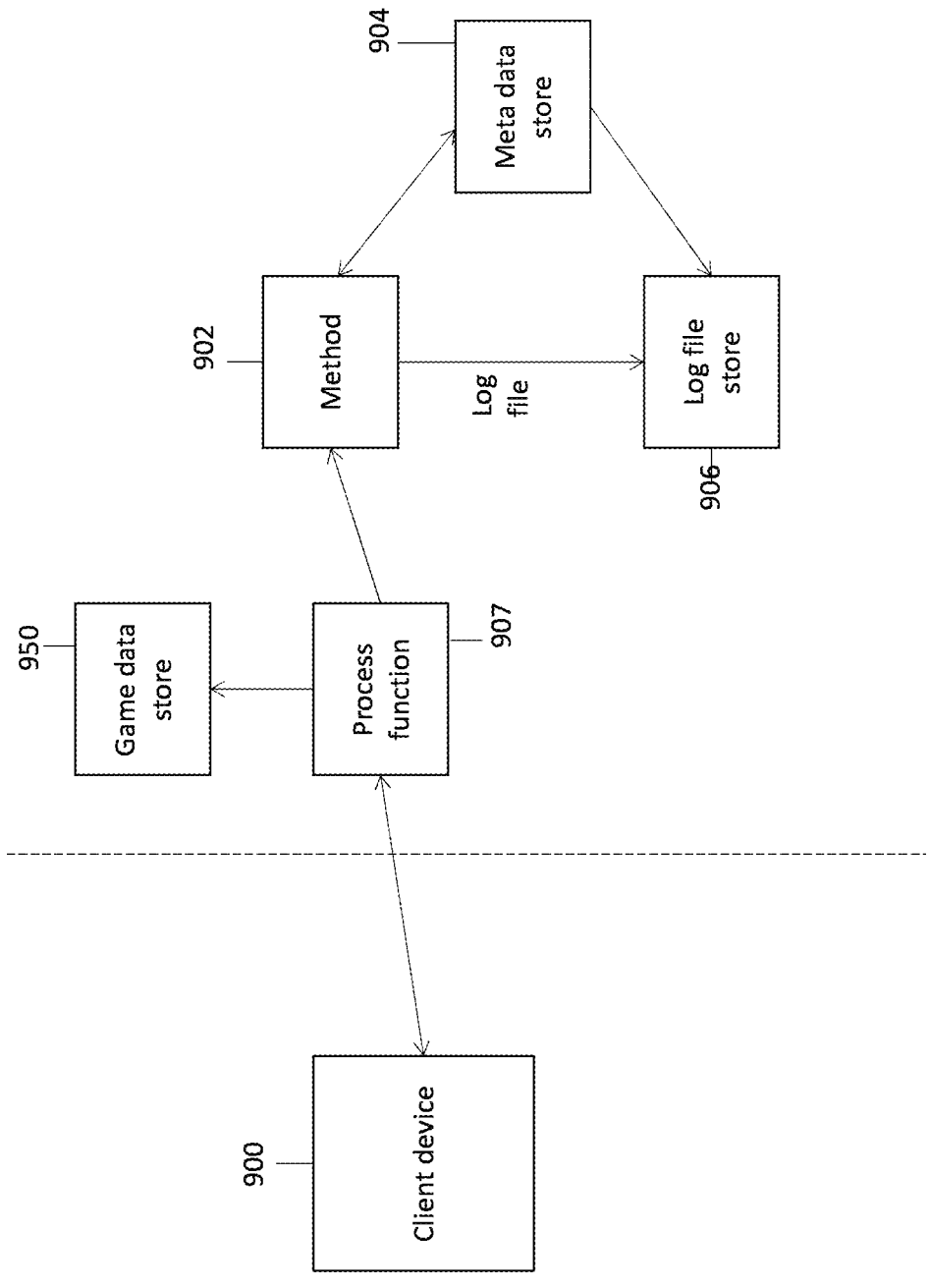
FIG. 7 schematically shows some of the functions provided by a server, according to some embodiments.

FIG. 7 is schematic and shows some of the functions provided on the server side. The physical entities which provide these functions may be any one or more suitable entities. The client device 900 (which may be as discussed in relation to FIG. 3) will allow the user to play the game. The client device will determine when a particular game event occurs and cause the client device to make a call to the method 902 which is on the server side. A process function 907 which may be provided by a server or the like will receive the call. The call is then directed to the method 902 by the process function. The method 902 may be on the same server as the process function or a different server to the process function. The server side also has the game data store 950 which stores a user's data, such as progress data or the like. Data for the game data store 950 may be received by the process function and directed to the game data store. In response to the invoking of the method 902, a log file is generated and is stored in a log file store 906. Any suitable data store 906 may be used to store the log file data 906, which may be the form of text files, as discussed above.

Meta data may provide a key to the data stored in the log files in the log file store. This will define for each of the game event identifiers, the format of the information stored in the log file. A separate store 904 can be provided for this metadata. This metadata store 904 can be used to determine how to parse the stored log files and allows new queries to be formulated easily. Analytics for the data can be determined by using the information in the metadata store to form queries which can then be used to parse the data store which has the text data files.

It should be appreciated that the data in the log file may be provided by the client device. This data may be some of the data to be stored in the game data store and/or may be provided specifically for the log file. The server side may provide data such as for example time stamp information or the like.

The same method associated with the end of game event is used by one or more games. This means that all the log files associated with that same end of game method will have the same identifier so that analytics can be performed across more than one game. Like for like comparisons can be made for the same event across different games.

It should be appreciated that there may be a plurality of instances of the method which can be called. The methods will however be the same for the same associated game event, regardless of the game.

When writing a new game, a decision can be made as to what game events are to cause the generation of a log file. For each of those game events, a method stored on the server side will be invoked or called. The method which is stored on the server side will be the same regardless of the game. The game developer will therefore not need to write new code for the reporting associated with a particular game event. The game developer may make sure that the code generates the information, for example parameter values, for the method and that the particular game event will cause the client device to call the server. The game developer may need to ensure that the semantics used in the game match the semantics used in the game event method.

It should be appreciated that embodiments may be used with any suitable game event. The game event may be the completion of a level, the start of a game, the ending of a game, purchasing of a particular item, interaction with one or more friend, a particular score or the like.

Figure 8:
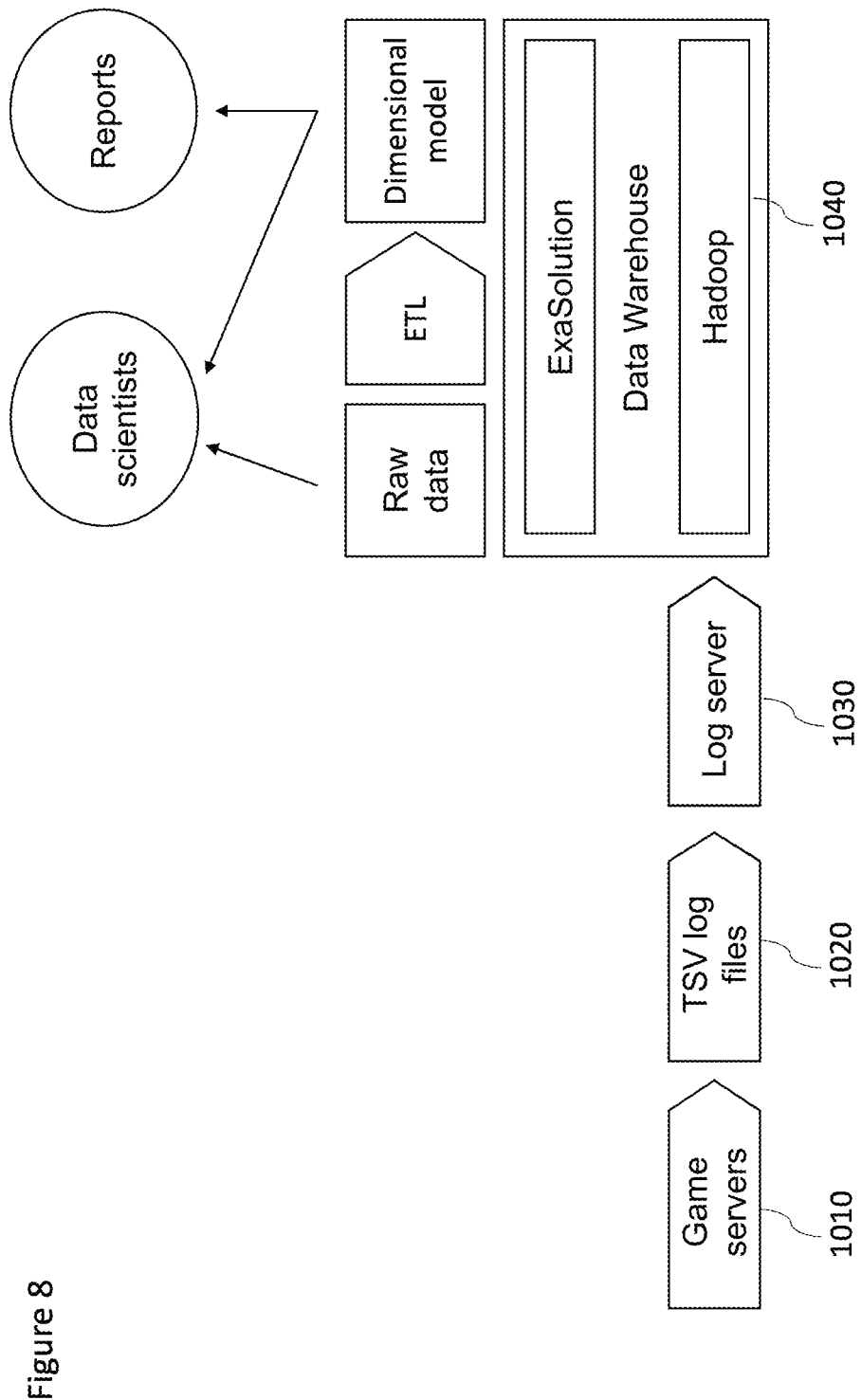
FIG. 8 shows a data pipeline according to some embodiments.

FIG. 8 shows a data pipeline. The data pipeline may be used with the system of FIG. 7 and/or in any other suitable scenario. The pipeline comprises game servers 1010, TSV (tab separated value) log files 1020, a log server 1030 and a data warehouse 1040. At the data warehouse, data is processed from raw data (which may be provided directly to data scientists) to a dimensional model which may be used to provide reports (or provided directly to data scientists). An extract, transfer, load ETL process may be used to transform the raw data to the dimensional model. Reports may be provided from the raw data and/or the dimensional model.

Figure 9:
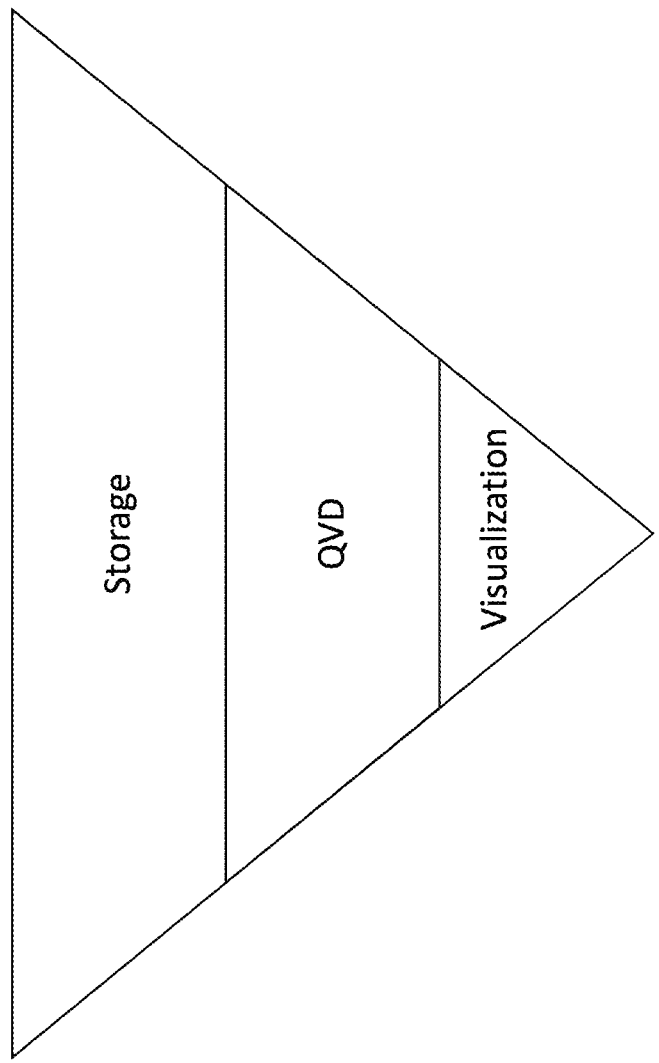
FIG. 9 shows the architecture of a reporting tool according to some embodiments.

FIG. 9 shows the architecture of a reporting tool in which data is directly imported from servers, e.g. MySQL (my sequel) or any other relational database management system servers, and all processing performed at the next level of the architecture, in this example QlikView (QV), before being provided to a visualisation layer. Other processing systems other than QV may alternatively or additionally be used. Such architecture may be suitable when dimensions are on a per user level. As more data are produced, for examples as games grow in popularity or the number of games increases, all reporting may be transitioned towards a per group (dimension) level. More and more processing may be pushed upstream. Architecture such as that of FIG. 9 may no longer be suitable.

Figure 10:
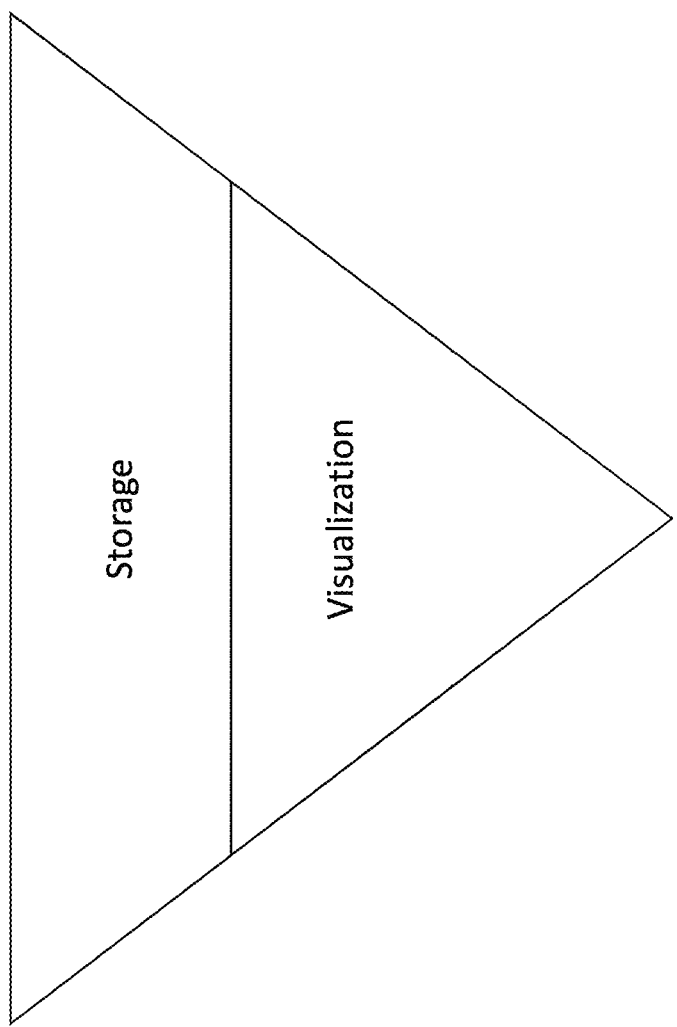
FIG. 10 shows the architecture of a reporting tool according to another embodiment.

An arrangement shown in FIG. 10 has a storage layer and a visualization layer. The visualization layer has to be much thicker (i.e. requires more processing) as compared to the scenario of FIG. 9.

With the improvement of the tracking and an increase in the number of games, there is a challenge of output to balance.

Figure 11:
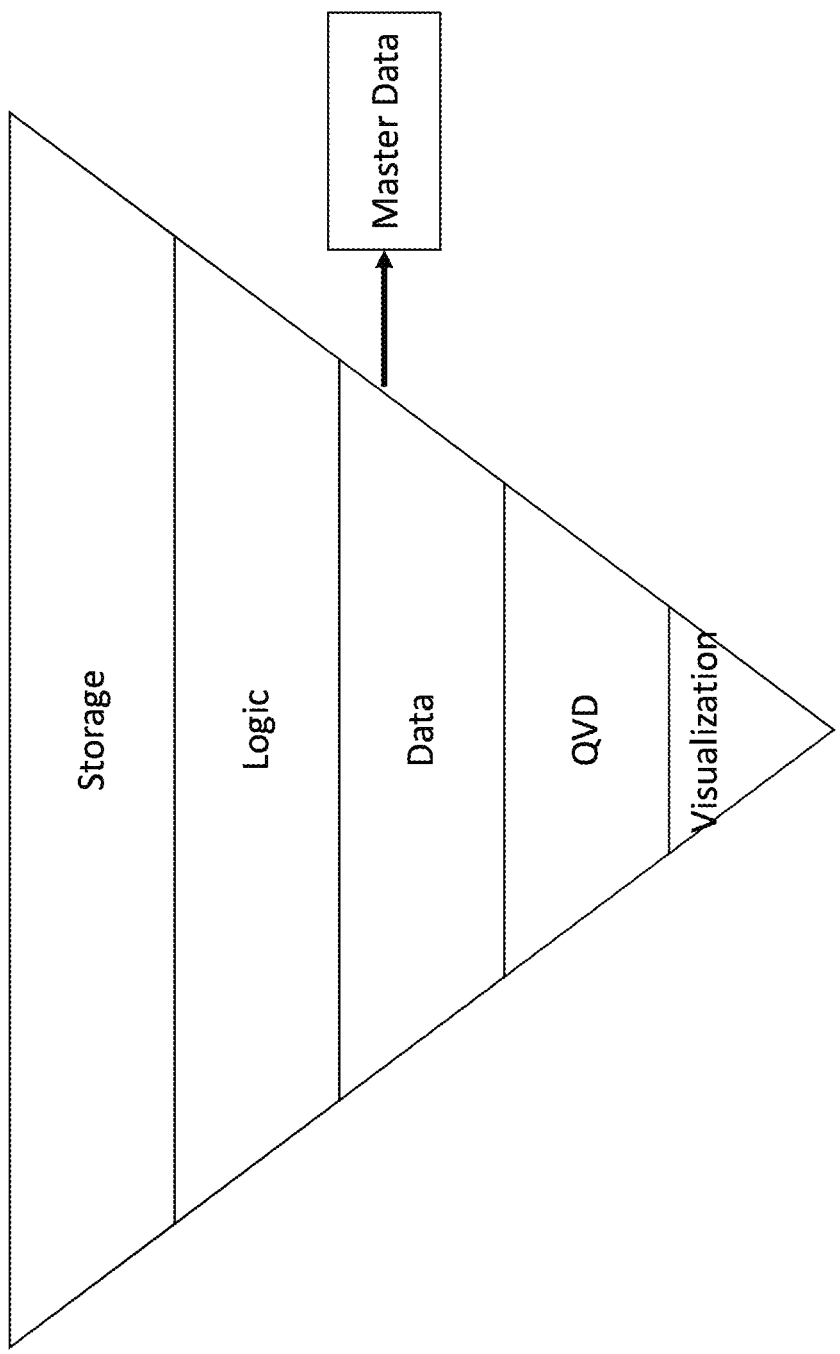
FIG. 11 shows the architecture of a reporting tool according to another embodiment.

An alternative solution is to apply all logic (and cleaning) as close to the source of the data as possible. FIG. 11 shows architecture of a reporting tool in accordance with some embodiments.

The reporting tool comprises a storage layer (for example, Hadoop cluster). Hadoop is an example of a computational cluster and in other embodiments, any other suitable computational cluster may be used. The storage layer is optimized for storage, not for speed—data can be dumped in this layer.

The architecture comprises a logic layer (for example, Exasol/Hive), the set of logic rules is provided as close to the storage as possible. Problems with data may be fixed at source. The architecture comprises a data layer (for example, Exasol/Hive). The cleaned data may be categorized into data types. This may make it easier to find data when searching.

The architecture may comprise a master data layer (e.g., Exasol/Hive) Master data dimensions are easily accessible and ready to be connected to ids in fact tables.

The logic layer produces a data layer, when pre-calculated KPIs (key performance indicators) and/or cleaned data can be fetched. The data layer may be separated into different types of data so that there is no need to search through the whole data when looking for a specific field or table. A notable separation of data types may be the separation of master data.

Exasol is an example of a relation database system. In other embodiments, any other suitable type of relation database system may be used. Hive is provided to support Hadoop structures.

Figure 12:
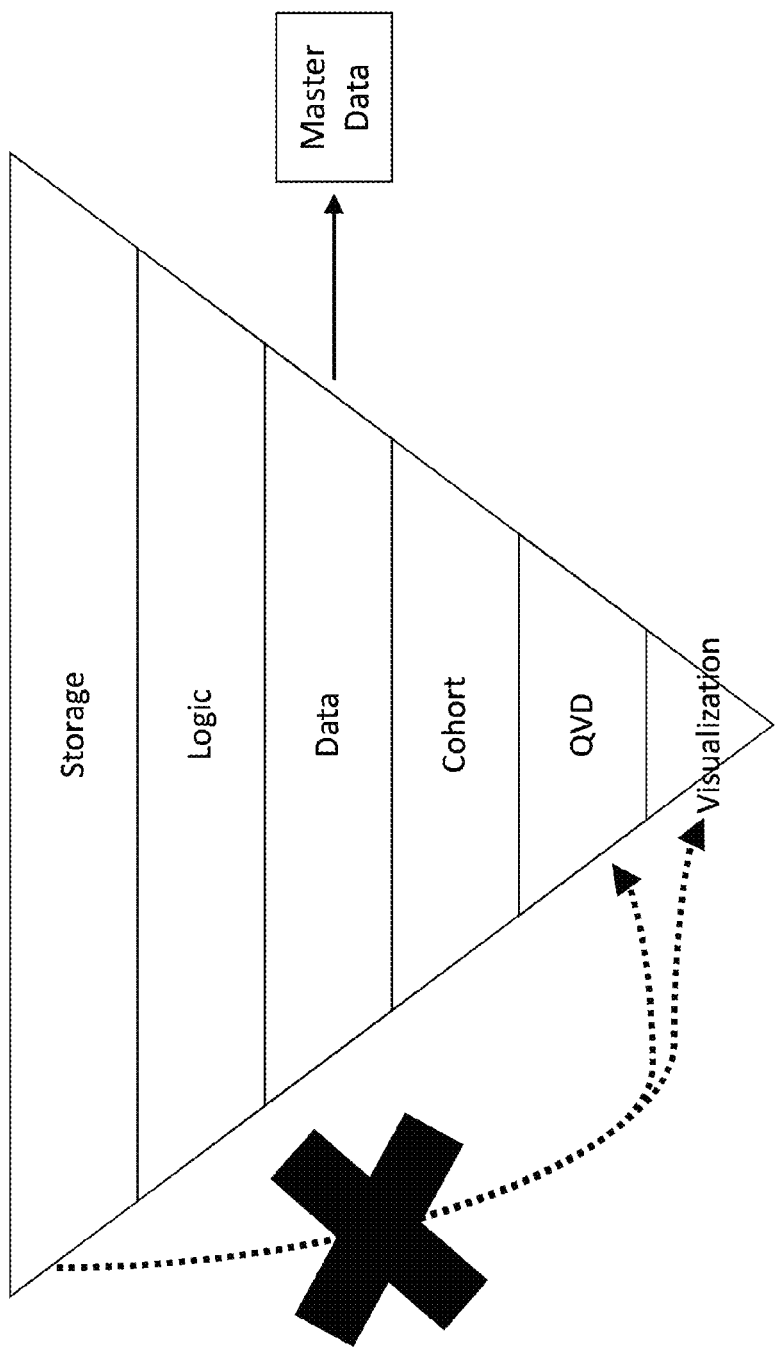
FIG. 12 shows the architecture of a reporting tool according to another embodiment.

As shown in FIG. 12, the architecture may comprise a cohort layer (e.g., Exasol datamart). The data in the cohort layer may be pre-aggregated and optimized for speed.

A QVD (QlikVliew data) layer (fileserver) is provided. The QVD layer may report a specific data layer. The QVD layer may be optimized for accessibility (and/or for storing optional data).

A visualization layer (Qlikview) is provided. The visualization layer is optimized for user experience.

Master data is a number of slowly changing dimensions that can be attributed to an ID, like ArticleName for articleID, or GameTitle for gameID. These are by way of example only and any other suitable ID (identity) may alternatively or additionally be used. The general idea is that master data can be applied to all values in the visualization layer, so there is no need to rerun an entire QVD layer because of an update of a field in the master data.

The aggregation of data from the data layer to the QVD layer may be a heavy duty for a daily process. As shown in FIG. 12, the architecture may comprise a layer, a cohort layer, for the most commonly used data. This layer may have a required minimum aggregation level (for example, daily).

This layer can pre-aggregate the most commonly used data from the data layer into what may be referred to as "cubes". These "cubes" may be fast to load from, but not very dynamic.

At the end of the data chain, QVD-loaders can load data from either the data layer (some cases) or the cohort layer (most cases) and store it on a dedicated fileserver.

It may not be desirable to fetch data directly from the storage layer as it may contain bad quality data, or even errors. In some embodiments, business logic may be provided in the QVD-loader which would negate providing all the logic in one place—the logic layer.

Finally these QVDs are loaded with an optimized load into the visualization layer. Thus in some embodiments, nothing is provided to the visualisation later without being used. In the visualization layer, if a field is not being used, it should not be kept. This helps keep the data environment maintainable. The field may be kept in the QVD layer or earlier up the chain if it may be needed in future.

Each layer may be provided with performance and maintainability in mind. The funnel of data from storage to visualization may provide only high quality data, delivered with dependability and speed. It may also avoid having to deal with one field with two different names in different reports.

The reason for this is that in addition to just adding layer upon layer of structure, each layer may be selected to do the function for which it designed. The surrounding framework may be built on top of those strengths.

Storage layer—Optimized for storage, not for speed. The data is dumped here.

Logic layer—Set of rules as close to the storage as possible. This allows problems to be fixed at source.

Data layer—Cleaned data categorized into data types. This makes it easier to find what is being looked for.

Master data layer—Master data dimensions easily accessible and ready to be connected to IDs in fact tables.

Cohort layer—Pre-aggregated data, optimized for speed.

QVD layer (fileserver)—Report specific data layer. Optimized for accessibility (also storing optional data).

Visualization layer—Optimized for user experience.

The game may for instance be played in an offline mode on a handheld device 200, 305 using locally stored information on the handheld device 200, 305. The device may store all or some of the levels that are available as applicable to the particular game and its saga or mission objectives. Some of the features may be locally executed on the device 200, 305. This may for instance implement a scheme to regenerate lives after a certain period of time, the time may be locally decided based on the clock on the device 200, 305. In some embodiments, the central game server 320 clock may override the local clock when the local device 200 has been synchronised with the server 320.

Some embodiments may be implemented to synchronize game state information 120, 150 and/or retrieve and connect to social graph information and user profile data on a social network 330 such as Facebook or Google+.

Some embodiments may be implemented to enable connection to a plurality of social networks 330. The user may be given the option to select which information may be derived and/or shared with which social network 330.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

It is also noted herein that there are several variations and modifications which may be made to the disclosed solution without departing from the scope of the present disclosure.

The invention claimed is:

1. A computer implemented method of providing a game, the method comprising the following implemented by at least one processor and at least one memory of a device:
   retrieving from at least one memory information associated with a plurality of first objects, each first object having at least a first characteristic and at least one first object having an action characteristic, and causing said first objects to be displayed with respective first characteristics and any action characteristic on a first area of a display in an arrangement;
   executing an algorithm which:
   identifies a match condition between at least three of said first objects having a same first characteristic in which at least one of said first objects satisfying the match condition has an action characteristic and in response thereto activating said action characteristic;
   determines at least one upgrade path in the arrangement in dependence on the activated action characteristic of the at least one of said first objects satisfying the match condition, the upgrade path having a plurality of first objects arranged along the upgrade path; and
   determines that at least one first object, other than said first objects satisfying said match condition, is positioned on the at least one upgrade path and has an action characteristic associated with one of a plurality of level values, and, determines an upgraded level value of the action characteristic of that at least one first object positioned on the determined upgrade path.

2. A method according to claim 1, wherein the algorithm causes a second game object to be displayed moving along the determined upgrade path.

3. A method according to claim 1, wherein the level value comprises a predetermined number of values up to a maximum value.

4. A method according to claim 3, wherein the algorithm increments the level value associated with the at least one first object positioned on the determined upgrade path to the next level value.

5. A method according to claim 3, wherein when the level value associated with the first game object positioned on the determined upgrade path corresponds to the maximum value, the algorithm:
   determines at least one second upgrade path;
   determines if at least one first object comprising an action characteristic is positioned on the at least one second upgrade path and, if so, determines a level value of that at least one first object positioned on the determined second upgrade path.

6. A method according to claim 1, wherein the algorithm causes an updated arrangement to be displayed with said at least one first object positioned on the determined upgrade path indicating the level value.

7. A method according to claim 1, wherein identifying a match condition comprises:
   determining a selection of a first game object in dependence on user input received via a user interface and in dependence on the stored information on said arrangement, and
   executing an algorithm to determine if said user input is such that said first objects are arranged to provide a sequence of at least three adjacent first objects sharing at least one same characteristic.

8. A method according to claim 1, comprising:
   retrieving from at least one memory information associated with a plurality of third game objects and causing said third game objects to be displayed on a second area of the display, wherein said algorithm:
   determines if at least one third game object is positioned on the determined first upgrade path and, if so determines at least one third upgrade path in the arrangement; and
   determines if at least one first object comprising an action characteristic is positioned on the at least one third upgrade path and, if so, determines a level value of said at least one first object positioned on the third upgrade path.

9. An apparatus comprising at least one processor and at least one memory, said at least one processor and said at least one memory configured to:
   retrieve from at least one memory information associated with a plurality of first objects, each first object having at least a first characteristic and at least one first object having an action characteristic, and causing said first objects to be displayed with respective first characteristics on a first area of a display in an arrangement;
   identify a match condition between at least three of said first objects having a same first characteristic in which at least one of said first objects satisfying the match condition has an action characteristic and in response thereto activating said action characteristic;
   determine at least one upgrade path in the arrangement in dependence on the activated action characteristic of the at least one of said first objects satisfying the match condition, the upgrade path having a plurality of first objects arranged along the upgrade path; and
   determine that at least one first object, other than said first objects satisfying said match condition, is positioned on the at least one upgrade path and has an action characteristic associated with one of a plurality of level values, and, determine an upgraded level value of the at least one first object positioned on the determined upgrade path.

10. An apparatus according to claim 9 wherein the apparatus is configured to cause a second game object to be displayed moving along the determined upgrade path.

11. An apparatus according to claim 9, wherein the level value comprises a predetermined number of values up to a maximum value.

12. An apparatus according to claim 11, wherein the apparatus is configured to increment the level value associated with the at least one first object positioned on the determined upgrade path to the next level characteristic value.

13. An apparatus according to claim 11, wherein when a level value corresponds to the maximum value, the apparatus is configured to:
   determine at least one second upgrade path in the arrangement in dependence on the action characteristic;
   determine if at least one first object comprising an action characteristic is positioned on the at least one second upgrade path if so, determine a level value of that at least one first object positioned on the second upgrade path.

14. An apparatus according to claim 9, wherein the apparatus is configured to cause an updated arrangement to be displayed with said at least one first object positioned on the determined upgrade path indicating the level value.

15. An apparatus according to claim 9, wherein identifying a match condition comprises:
   determining a selection of a first game object in dependence on user input received via a user interface and in dependence on the stored information on said arrangement; and
   the processor is configured to determine if said user input is such that said first objects are arranged to provide a sequence of at least three adjacent first objects sharing at least one same characteristic.

16. An apparatus according to claim 9, configured to:
   retrieve from at least one memory information associated with a plurality of third game objects and cause said third game objects to be displayed on a second area of the display;
   determine if at least one third game object is positioned on the determined upgrade path and, if so determines at least one third upgrade path; and
   determine if at least one first object comprising an action characteristic is positioned on the at least one third upgrade path and, if so, determines a level value of said at least one first object positioned on the third upgrade path.

17. A computer readable storage device storing instructions that, when processed by at least one processor of a device, causes said processor to:
   retrieve from at least one memory information associated with a plurality of first objects, each first object having at least a first characteristic and at least one first object having an action characteristic, and causing said first objects to be displayed with respective first characteristics and any action characteristic on a first area of a display in an arrangement;
   identify a match condition between said first objects having a same first characteristic in which at least one of said objects has an action characteristic;
   determine at least one upgrade path in the arrangement in dependence on the action characteristic; and
   determine that at least one first object, other than said first objects satisfying said match condition, is positioned on the at least one upgrade path and has an action characteristic associated with one of a plurality of level values, and, if so, determine an upgraded level value of the action characteristic of that at least one first object positioned on the determined upgrade path.

\* \* \* \* \*